(12) United States Patent
Watanabe et al.

(10) Patent No.: US 10,703,188 B2
(45) Date of Patent: Jul. 7, 2020

(54) VEHICLE

(71) Applicant: TOYOTA JIDOSHA KABUSHIKI KAISHA, Toyota-shi, Aichi-ken (JP)

(72) Inventors: Hirotaka Watanabe, Toyota (JP); Shigeyuki Inoue, Toyota (JP); Toshio Uchiyama, Toyota (JP); Satoshi Inukai, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/284,022

(22) Filed: Feb. 25, 2019

(65) Prior Publication Data
US 2019/0291557 A1 Sep. 26, 2019

(30) Foreign Application Priority Data
Mar. 22, 2018 (JP) .................................. 2018-054792

(51) Int. Cl.
*B60K 1/04* (2019.01)

(52) U.S. Cl.
CPC ........ B60K 1/04 (2013.01); *B60K 2001/0438* (2013.01)

(58) Field of Classification Search
CPC .. B60K 2001/0438; B60K 1/04; B60R 16/04; H01M 2/1016; H01M 2/1072
See application file for complete search history.

(56) References Cited

U.S. PATENT DOCUMENTS

| | | | |
|---|---|---|---|
| 2011/0143179 A1* | 6/2011 | Nakamori | B60K 1/04 429/99 |
| 2012/0161429 A1* | 6/2012 | Rawlinson | B60N 2/012 280/801.1 |
| 2012/0161472 A1* | 6/2012 | Rawlinson | B60K 1/04 296/187.08 |
| 2012/0301765 A1* | 11/2012 | Loo | H01M 2/1083 429/100 |
| 2017/0001507 A1* | 1/2017 | Ashraf | B60K 1/04 |
| 2017/0246943 A1* | 8/2017 | Salz-Breuer | B60K 1/04 |
| 2018/0105209 A1* | 4/2018 | Fees | B60K 1/04 |
| 2018/0162447 A1* | 6/2018 | Fees | B62D 21/07 |
| 2018/0186227 A1* | 7/2018 | Stephens | H01M 2/1083 |
| 2018/0337377 A1* | 11/2018 | Stephens | H01M 2/1083 |
| 2018/0337378 A1* | 11/2018 | Stephens | H01M 2/1083 |
| 2019/0074495 A1* | 3/2019 | Hauesler | H01M 10/613 |
| 2019/0081298 A1* | 3/2019 | Matecki | H01M 2/1083 |

(Continued)

FOREIGN PATENT DOCUMENTS

JP  2011-126452 A  6/2011

*Primary Examiner* — Erez Gurari
(74) *Attorney, Agent, or Firm* — Sughrue Mion, PLLC

(57) ABSTRACT

A vehicle includes: a floor panel; and a battery pack mounted under the floor panel. The battery pack includes: a plurality of cell stacks; a housing case including a bottom portion and configured to house the plurality of cell stacks; and a plurality of support members provided on the bottom portion and spaced apart from one another. When a front region, a central region and a rear region are defined in a bottom view of the housing case, a ratio of a total area where the support member is provided in the central region to an area of the central region is higher than a ratio of a total area where the support member is provided in the rear region to an area of the rear region.

3 Claims, 8 Drawing Sheets

(56) References Cited

U.S. PATENT DOCUMENTS

| | | | | |
|---|---|---|---|---|
| 2019/0275874 A1* | 9/2019 | Fukui | ............... | B62D 25/20 |
| 2019/0275875 A1* | 9/2019 | Fukui | ............... | B62D 21/03 |
| 2019/0276081 A1* | 9/2019 | Otoguro | ............ | B62D 21/03 |
| 2019/0291557 A1* | 9/2019 | Watanabe | ............ | B60K 1/04 |
| 2019/0291558 A1* | 9/2019 | Goto | ............... | H01M 2/1083 |
| 2019/0326573 A1* | 10/2019 | Ozawa | ............ | H01M 2/1077 |
| 2019/0334144 A1* | 10/2019 | Kim | ............... | B23K 20/122 |
| 2019/0337402 A1* | 11/2019 | Gunther | ............ | H01M 10/625 |

\* cited by examiner

VEHICLE

This nonprovisional application is based on Japanese Patent Application No. 2018-054792 filed on Mar. 22, 2018 with the Japan Patent Office, the entire contents of which are hereby incorporated by reference.

BACKGROUND

Field

The present disclosure generally relates to a vehicle, and more particularly to a vehicle having a battery pack mounted under a floor panel.

Description of the Background Art

For example, Japanese Patent Laying-Open No. 2011-126452 discloses a structure for attaching a battery for an electric powered vehicle mounted under a vehicle body floor.

SUMMARY

As disclosed in Japanese Patent Laying-Open No. 2011-126452 above, a vehicle having a battery pack mounted under a floor panel of the vehicle has been known.

In such a vehicle, the battery pack interferes with, for example, a fallen object on a road surface or a height difference of a road surface, and is easily subjected to shock from the road surface. Therefore, it is conceivable to provide a plurality of support members in the battery pack for reinforcement. However, if the plurality of support members are provided uniformly, the support members are provided even in a region that does not require high strength, which leads to an increase in amount of the support members. As a result, a weight of the battery pack may increase.

Accordingly, an object of the present disclosure is to solve the above-described problem and provide a vehicle that makes it possible to appropriately protect a battery pack against shock from a road surface, while suppressing an increase in weight.

A vehicle according to the present disclosure includes: a floor panel; and a battery pack mounted under the floor panel. The battery pack includes: a plurality of cell stacks; a housing case including a bottom portion and configured to house the plurality of cell stacks; and a plurality of support members provided on the bottom portion and spaced apart from one another. When a front region, a central region and a rear region are defined in a bottom view of the housing case, a ratio of a total area where the support member is provided in the central region to an area of the central region is higher than a ratio of a total area where the support member is provided in the rear region to an area of the rear region, the central region being located on a vehicle rear side of the front region and being equal in length in a vehicle front-rear direction to the front region, the rear region being located on the vehicle rear side of the central region and being equal in length in the vehicle front-rear direction to the front region.

According to the vehicle configured as described above, the plurality of support members are provided at different area ratios in the central region and in the rear region, and thus, an amount of the support members can be reduced. As a result, an increase in weight of the battery pack caused by placement of the support members can be suppressed. In addition, the central region is easily subjected to interference from a road surface when the vehicle inclines. Therefore, by providing the support members in the central region at a relatively high area ratio, the battery pack can be appropriately protected against shock from the road surface.

Preferably, the vehicle further includes: a front wheel; and a rear wheel provided at a distance from the front wheel toward the vehicle rear side. The central region is defined over a range from a first position between the front wheel and the rear wheel to a second position between the front wheel and the rear wheel in the vehicle front-rear direction. The rear region is defined over a range from the second position to a third position overlapping with the rear wheel in the vehicle front-rear direction.

According to the vehicle configured as described above, the rear region is provided over the range up to the third position overlapping with the rear wheel in the vehicle front-rear direction, and thus, a height between the road surface and the rear region is easily ensured by the rear wheel. Therefore, also in such a configuration that the support members are provided in the rear region at a relatively low area ratio, the battery pack can be appropriately protected.

Preferably, the front region is defined over a range from a fourth position between the front wheel and the rear wheel to the first position in the vehicle front-rear direction. When the front region is divided into a first divided region and a second divided region located on the vehicle rear side of the first divided region and being equal in length in the vehicle front-rear direction to the first divided region, a ratio of a total area where the support member is provided in the second divided region to an area of the second divided region is higher than a ratio of a total area where the support member is provided in the first divided region to an area of the first divided region.

According to the vehicle configured as described above, in the front region, a height between the road surface and the first divided region is easily ensured by the front wheel, whereas it is more difficult to ensure a height between the road surface and the second divided region, as compared with the height between the road surface and the first divided region. Therefore, by providing the support members in the second divided region at a relatively high area ratio, the battery pack can be appropriately protected against shock from the road surface.

Preferably, the support members are arranged on an outer side of the housing case. When cut along a vertical plane, each of the support members has a cross-sectional shape having a base portion provided below the bottom portion at a distance therefrom, and a pair of leg portions extending upwardly from both ends of the base portion and abutting on the bottom portion at ends of the pair of leg portions.

According to the vehicle configured as described above, the support members subjected to shock from the road surface are deformed such that the base portions are displaced upwardly. Thus, the shock can be efficiently absorbed by the support members and transmission of the shock to the housing case can be suppressed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
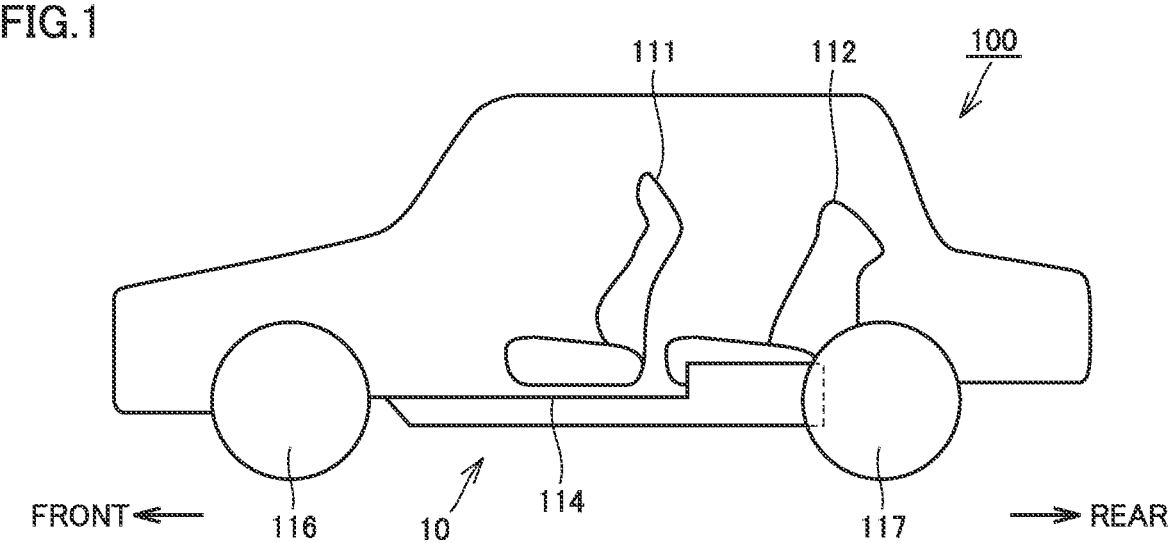
FIG. 1 is a side view showing a vehicle according to an embodiment of the present disclosure.

An embodiment of the present disclosure will be described with reference to the drawings. In the drawings referenced below, the same or corresponding members are denoted by the same reference numerals.

FIG. 1 is a side view showing a vehicle according to an embodiment of the present disclosure. Referring to FIG. 1, a vehicle 100 according to the present embodiment is an electric vehicle and has an electric motor as a prime mover for driving the vehicle. Vehicle 100 has a front seat 111, a rear seat 112, a floor panel 114, a front wheel 116, a rear wheel 117, and a battery pack 10.

Floor panel 114 is a panel member forming a floor of vehicle 100. Battery pack 10 is mounted under floor panel 114. Battery pack 10 is provided between a road surface on which vehicle 100 travels and floor panel 114 in an up-down direction.

Battery pack 10 is provided between front seat 111 and rear seat 112 in a vehicle front-rear direction. Battery pack 10 is provided between front wheel 116 and rear wheel 117 in the vehicle front-rear direction.

Figure 2:
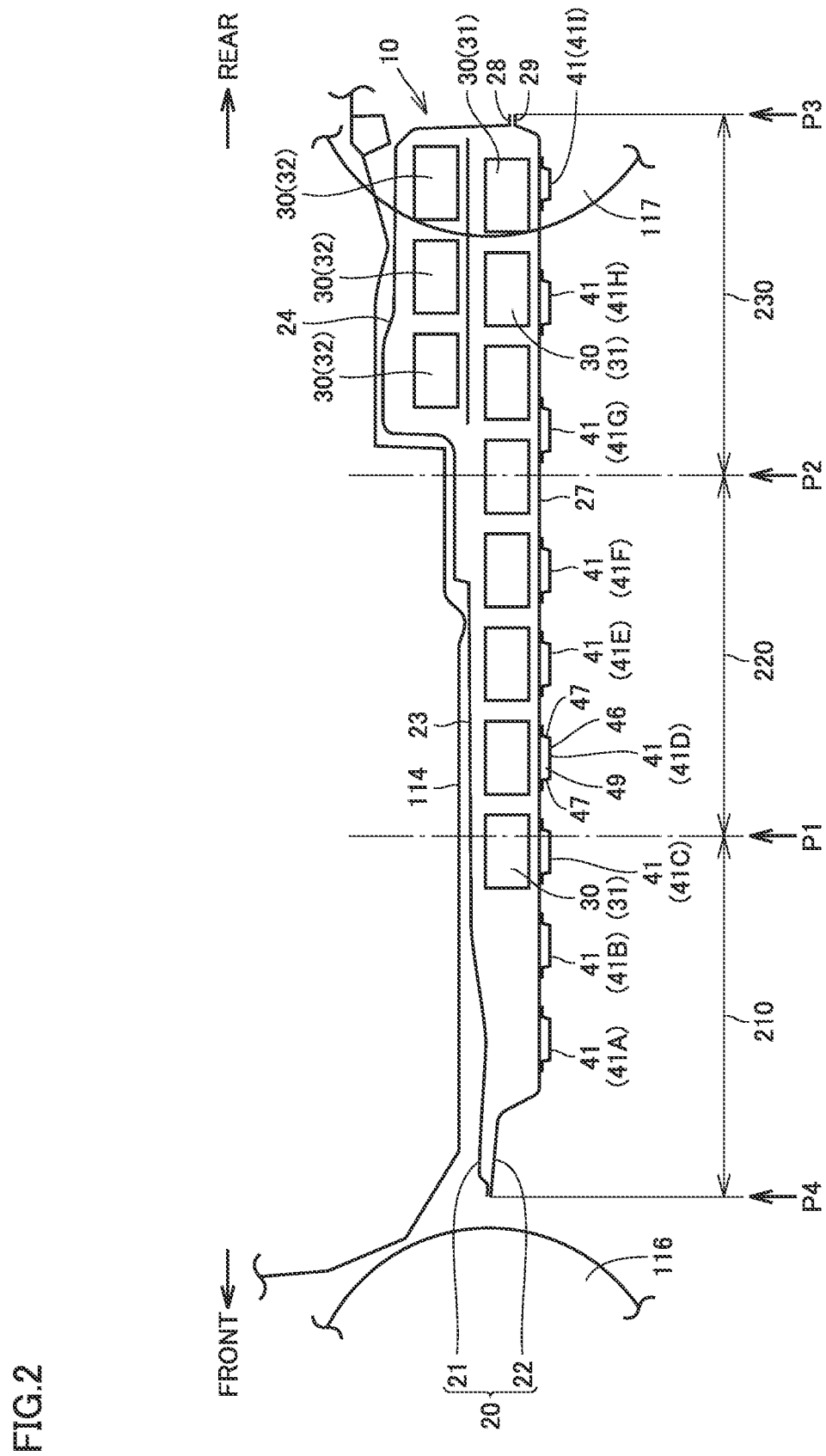
FIG. 2 is a cross-sectional view showing an overview of a battery mounting structure in the vehicle in FIG. 1.
Figure 3:
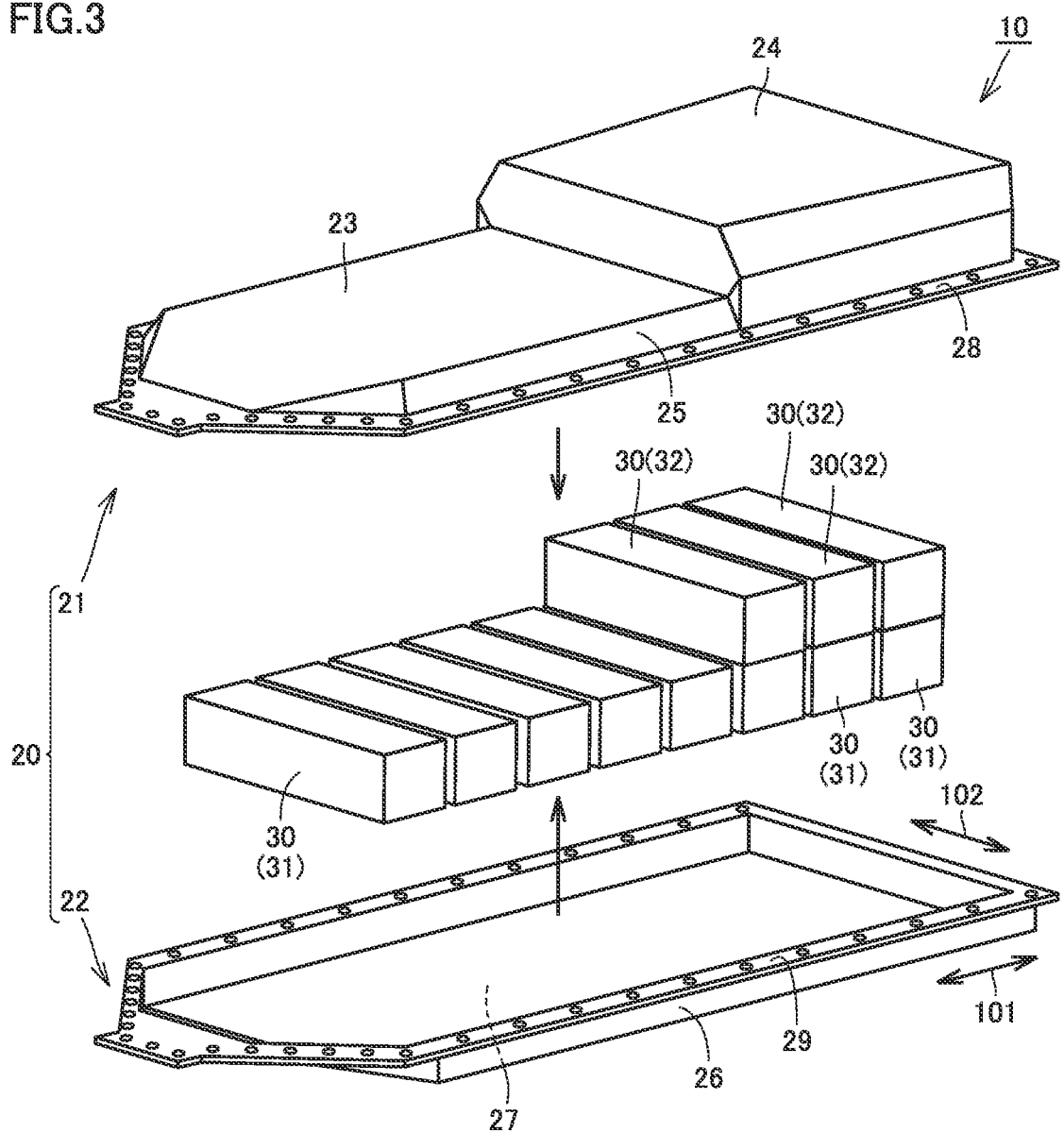
FIG. 3 is an exploded view showing a battery pack in FIG. 1.

FIG. 2 is a cross-sectional view showing an overview of a battery mounting structure in the vehicle in FIG. 1. FIG. 2 shows a cross section when vehicle 100 is cut along a plane orthogonal to a vehicle width direction. FIG. 3 is an exploded view showing the battery pack in FIG. 1.

Referring to FIGS. 2 and 3, battery pack 10 has a housing case 20 and a plurality of cell stacks 30.

Housing case 20 is formed of a case body that forms an internal space, and has an appearance extending in the shape of a flat plate in a horizontal direction, with the up-down direction corresponding to a thickness direction. Housing case 20 as a whole has a rectangular shape in a top view, in which the vehicle front-rear direction (direction indicated by an arrow 101 in FIG. 3) corresponds to a longer side direction and the vehicle width direction (direction indicated by an arrow 102 in FIG. 3) corresponds to a shorter side direction.

The plurality of cell stacks 30 are housed in housing case 20. Housing case 20 has a bottom portion 27. Bottom portion 27 forms a bottom wall of housing case 20. The plurality of cell stacks 30 are housed on bottom portion 27.

Housing case 20 has an upper case 21 and a lower case 22. Upper case 21 has a box shape that is open downwardly. Upper case 21 has a ceiling portion 23, a sidewall portion 25 and a flange portion 28. Ceiling portion 23 forms an upper wall of housing case 20. Ceiling portion 23 has a raised portion 24. Raised portion 24 has a shape of being raised upwardly in ceiling portion 23. Raised portion 24 is provided on the vehicle rear side. A plurality of second cell stacks 32 described below are housed in raised portion 24. Sidewall portion 25 is provided to extend downwardly from an outer peripheral edge of ceiling portion 23. Flange portion 28 extends from a lower end of sidewall portion 25 to the outside of housing case 20, thereby forming a flange shape.

Lower case 22 has a box shape that is open upwardly. Lower case 22 has bottom portion 27 described above, a sidewall portion 26 and a flange portion 29. Bottom portion 27 is provided to face ceiling portion 23 in the up-down direction. Sidewall portion 26 is provided to extend upwardly from an outer peripheral edge of bottom portion 27. Sidewall portion 26 forms a sidewall of housing case 20, together with sidewall portion 25 of upper case 21. Flange portion 29 extends from an upper end of sidewall portion 26 to the outside of housing case 20, thereby forming a flange shape.

With flange portion 28 and flange portion 29 being stacked in the up-down direction, flange portion 28 and flange portion 29 are fastened by a plurality of fastening members (not shown). As a result, upper case 21 and lower case 22 are integrally coupled to each other and form a space for housing the plurality of cell stacks 30.

The plurality of cell stacks 30 have a plurality of first cell stacks 31 and a plurality of second cell stacks 32. The plurality of first cell stacks 31 are spaced apart from one another and arranged side by side in the vehicle front-rear direction. As one example, eight first cell stacks 31 are arranged side by side. Each of first cell stacks 31 has a plurality of cells (not shown) arranged side by side in the vehicle width direction. As one example, each of first cell stacks 31 has approximately 24 to 30 cells.

The plurality of second cell stacks 32 are spaced apart from one another and arranged side by side in the vehicle front-rear direction. The plurality of second cell stacks 32 are stacked above the plurality of first cell stacks 31. The number of the plurality of second cell stacks 32 is smaller than the number of the plurality of first cell stacks 31. As one example, three second cell stacks 32 are arranged side by side. The plurality of second cell stacks 32 are stacked above the plurality of first cell stacks 31 arranged on the vehicle rear side, of the plurality of first cell stacks 31 as a whole. That is, the plurality of cell stacks 30 have a single-layer structure on the vehicle front side and have a stacked structure with upper and lower stages on the vehicle rear side.

Each of second cell stacks 32 has a plurality of cells (not shown) arranged side by side in the vehicle width direction. Each of second cell stacks 32 may have the smaller number of cells than that of first cell stack 31. As one example, each of second cell stacks 32 has approximately 21 to 27 cells.

Each of the cells included in first cell stacks 31 and second cell stacks 32 is, for example, a secondary battery such as a nickel-metal hydride battery or a lithium ion battery. Each of the cells has, for example, a rectangular shape. The secondary battery may be a battery including a liquid electrolyte, or a battery including a solid electrolyte.

Figure 4:
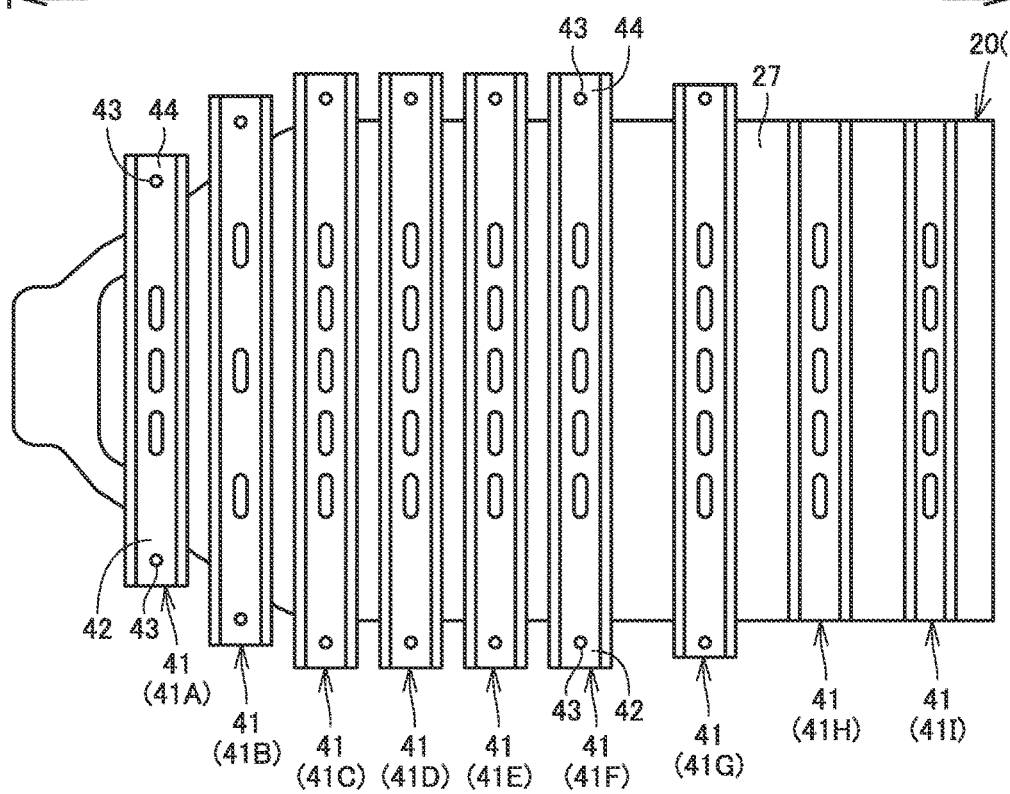
FIG. 4 is a bottom view showing the battery pack in FIG. 1.
Figure 5:
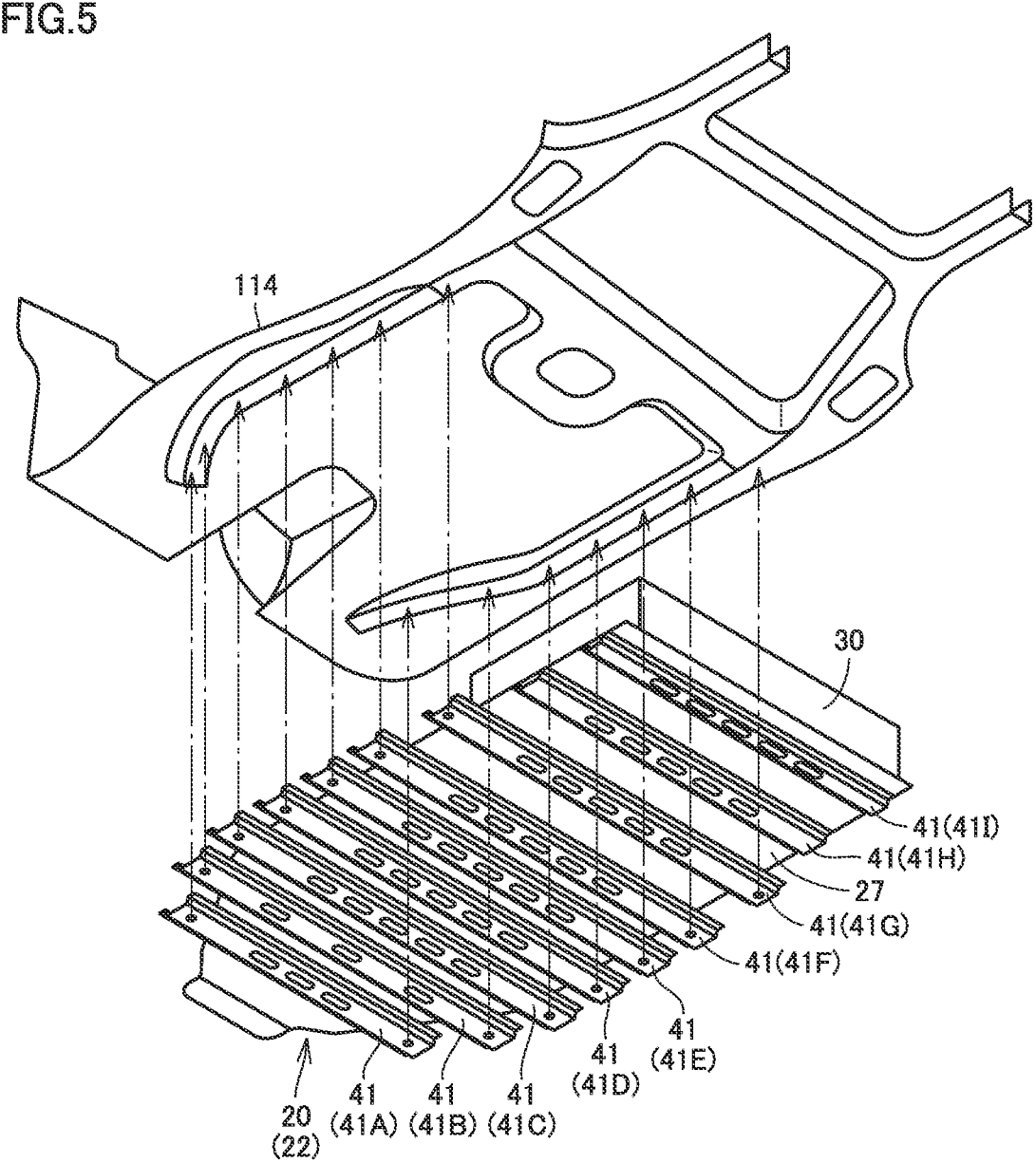
FIG. 5 is a perspective view showing a manner in which the battery pack is mounted under a floor panel.
Figure 6:
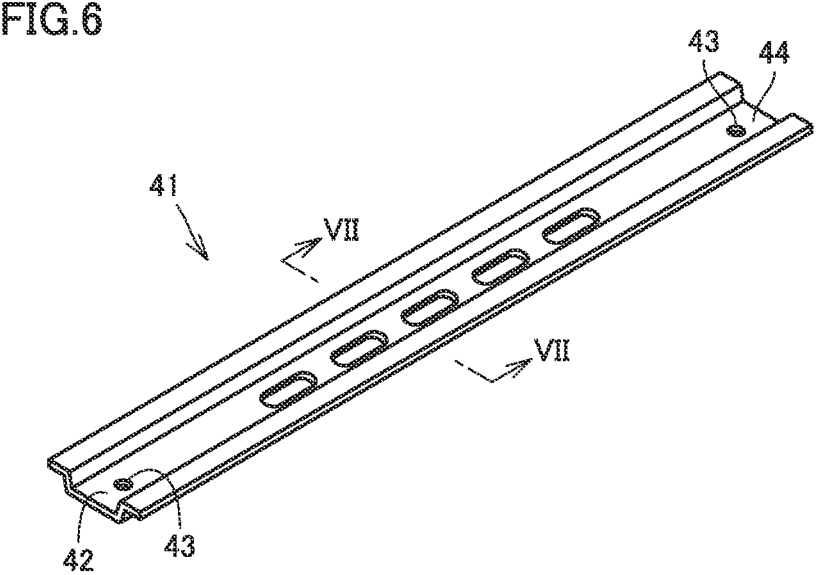
FIG. 6 is a perspective view showing a support member in FIG. 4.
Figure 7:
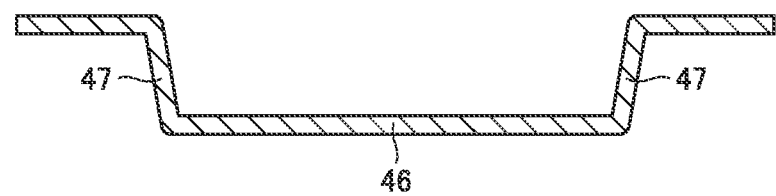
FIG. 7 is a cross-sectional view showing the support member viewed from an arrow direction on line VII-VII in FIG. 6.

FIG. 4 is a bottom view showing the battery pack in FIG. 1. FIG. 5 is a perspective view showing a manner in which the battery pack is mounted under the floor panel. In FIG. 5, upper case 21 of battery pack 10 is not shown. FIG. 6 is a perspective view showing a support member in FIG. 4. FIG. 7 is a cross-sectional view showing the support member viewed from an arrow direction on line VII-VII in FIG. 6.

Referring to FIGS. 2 to 7, battery pack 10 further has a plurality of support members 41 (41A, 41B, 41C, 41D, 41E, 41F, 41G, 41H, and 41I).

Support members 41 are provided on bottom portion 27. Support members 41 are arranged on an outer side of housing case 20. Support members 41 are fixed to bottom portion 27 from the outer side of housing case 20. Support members 41 are provided to face, in the up-down direction, a road surface on which vehicle 100 travels. Support members 41 may be fixed to bottom portion 27 by welding, or may be fixed to bottom portion 27 by fastening members such as bolts.

The plurality of support members 41 are provided to be parallel to one another. The plurality of support members 41 are spaced apart from one another. The plurality of support members 41 are provided along the vehicle width direction. The plurality of support members 41 are spaced apart from one another in the vehicle front-rear direction. Support member 41A, support member 41B, support member 41C, support member 41D, support member 41E, support member 41F, support member 41G, support member 41H, and support member 41I are arranged side by side from the vehicle front side to the vehicle rear side in the listed order.

Each of support members 41 is formed of a frame member extending in the vehicle width direction. As shown in FIGS. 2 and 7, when cut along a vertical plane orthogonal to the vehicle width direction, each of support members 41 has a cross-sectional shape having a base portion 46 and a pair of leg portions 47.

Base portion 46 is provided below bottom portion 27 at a distance therefrom. Base portion 46 is provided to be parallel to bottom portion 27. The pair of leg portions 47 extend upwardly from both ends of base portion 46 in the vehicle front-rear direction and abut on bottom portion 27 at ends of the pair of leg portions 47. The pair of leg portions 47 are spaced apart from one another in the vehicle front-rear direction. A space 49 is formed between bottom portion 27 and support member 41. Space 49 is partitioned by bottom portion 27, the pair of leg portions 47 and base portion 46.

Each of support members 41 (more specifically, support member 41A, support member 41B, support member 41C, support member 41D, support member 41E, support member 41F, and support member 41G) has a fastened portion 42 and a fastened portion 44. Fastened portion 42 and fastened portion 44 are provided at both ends of support member 41 extending in the vehicle width direction. Fastened portion 42 is provided to protrude from housing case 20 (bottom portion 27) on one side (right side) in the vehicle width direction. Fastened portion 44 is provided to protrude from housing case 20 on the other side (left side) in the vehicle width direction.

Each of fastened portion 42 and fastened portion 44 is provided with a bolt insertion hole 43. Bolt insertion hole 43 is formed of a through hole penetrating through base portion 46 in the up-down direction. As shown in FIG. 5, each of fastened portion 42 and fastened portion 44 is fastened to floor panel 114 by a bolt inserted into bolt insertion hole 43.

Support member 41H and support member 41I are provided not to protrude from housing case 20 in the vehicle width direction. Support member 41H and support member 41I have a cross-sectional shape of support member 41 shown in FIG. 7, while support member 41H and support member 41I do not have fastened portion 42 and fastened portion 44 shown in FIG. 6.

Figure 8:
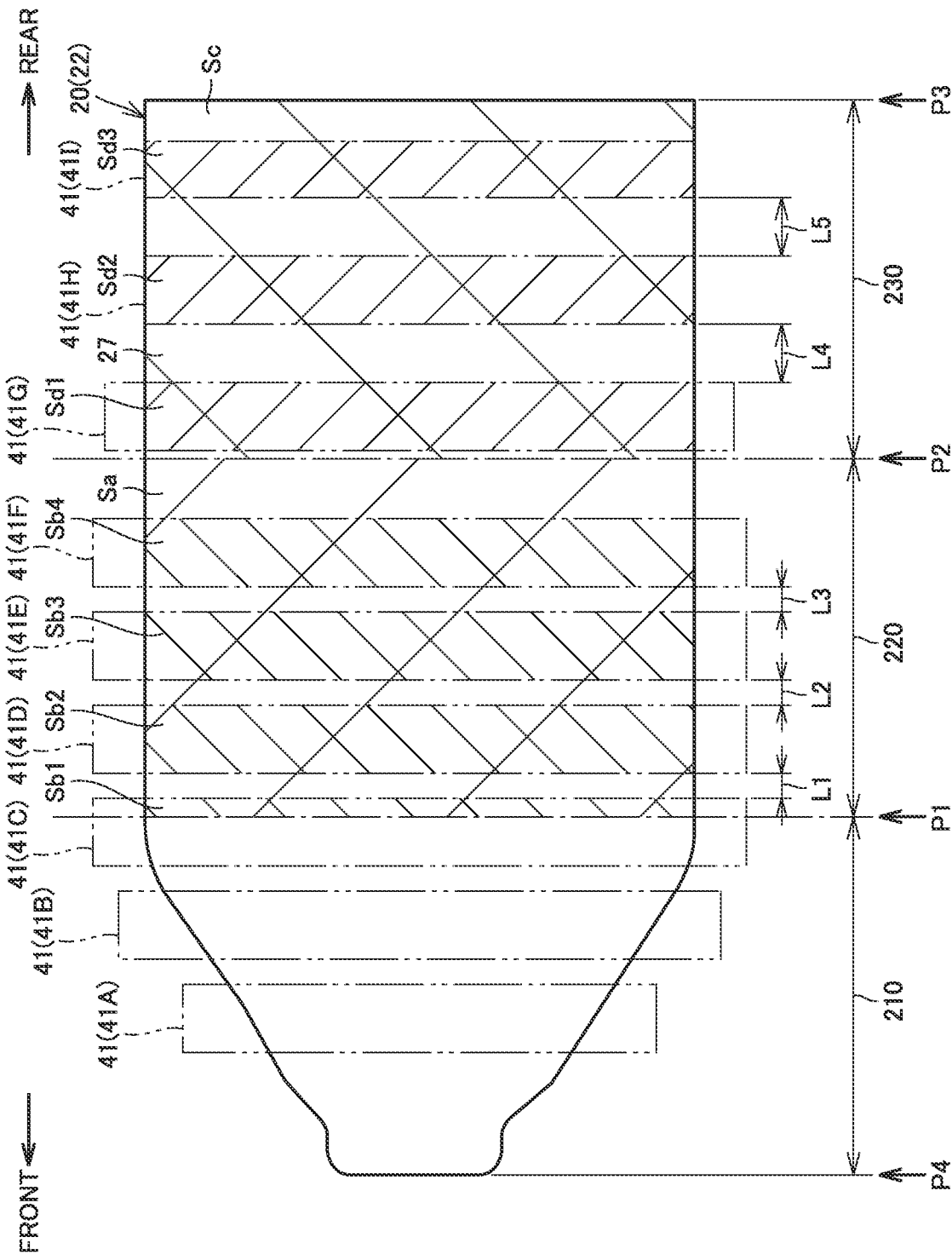
FIG. 8 is a bottom view for illustrating an area ratio between front, central and rear regions in a bottom view of a housing case and the support members provided in the respective regions.

FIG. 8 is a bottom view for illustrating an area ratio between front, central and rear regions in a bottom view of the housing case and the support members provided in the respective regions. In FIG. 8, a contour of housing case 20 (lower case 22) in a bottom view of battery pack 10 is indicated by a solid line, and contours of support members 41 are indicated by a two-dot chain line.

Referring to FIGS. 2 and 8, a front region 210, a central region 220 and a rear region 230 are defined in housing case 20 in a bottom view.

Of front region 210, central region 220 and rear region 230, front region 210 is located on the most vehicle front side. Central region 220 is located on the vehicle rear side of front region 210. Rear region 230 is located on the vehicle rear side of central region 220. Of front region 210, central region 220 and rear region 230, rear region 230 is located on the most vehicle rear side.

A length of central region 220 in the vehicle front-rear direction is equal to a length of front region 210 in the vehicle front-rear direction. A length of rear region 230 in the vehicle front-rear direction is equal to each of the lengths of front region 210 and central region 220 in the vehicle front-rear direction.

Front region 210, central region 220 and rear region 230 are defined such that front region 210, central region 220 and rear region 230 are arranged side by side from the vehicle front side to the vehicle rear side in the listed order and the lengths of the respective regions in the vehicle front-rear direction are equal to one another.

Central region 220 is defined over a range from a position P1 to a position P2 in the vehicle front-rear direction. Position P1 is located between front wheel 116 and rear wheel 117 in the vehicle front-rear direction. Position P2 is located on the vehicle rear side of position P1 and between front wheel 116 and rear wheel 117 in the vehicle front-rear direction.

Rear region 230 is defined over a range from above-described position P2 to a position P3 in the vehicle front-rear direction. Position P3 is a position at which a rear end of housing case 20 is arranged. Position P3 overlaps with rear wheel 117 in the vehicle front-rear direction. When vehicle 100 is viewed from the vehicle width direction, a portion of rear region 230 on the vehicle rear side overlaps with rear wheel 117.

Front region 210 is defined over a range from a position P4 to above-described position P1 in the vehicle front-rear direction. Position P4 is a position at which a front end of housing case 20 is arranged. Position P4 is located on the vehicle front side of position P1 and between front wheel 116 and rear wheel 117 in the vehicle front-rear direction.

Support member 41A, support member 41B and a part of support member 41C are provided in front region 210. The remaining portion of support member 41C, support member 41D, support member 41E, and support member 41F are provided in central region 220. Support member 41G, support member 41H and support member 41I are provided in rear region 230.

Central region 220 has an area Sa. Support member 41C has an area Sb1 when projected onto central region 220. Support member 41D has an area Sb2 when projected onto central region 220. Support member 41E has an area Sb3 when projected onto central region 220. Support member 41F has an area Sb4 when projected onto central region 220.

Rear region 230 has an area Sc. Support member 41G has an area Sd1 when projected onto rear region 230. Support member 41H has an area Sd2 when projected onto rear region 230. Support member 41I has an area Sd3 when projected onto rear region 230.

In such a configuration, a ratio of total areas where support members 41 are provided in central region 220 to the area of central region 220 is higher than a ratio of total areas where support members 41 are provided in rear region 230 to the area of rear region 230 ((Sb1+Sb2+Sb3+Sb4)/Sa>(Sd1+Sd2+Sd3)/Sc).

In central region 220, support member 41C and support member 41D are adjacent to each other in the vehicle front-rear direction, with an interval L1 provided therebetween. Support member 41D and support member 41E are adjacent to each other in the vehicle front-rear direction, with an interval L2 provided therebetween. Support member 41E and support member 41F are adjacent to each other in the vehicle front-rear direction, with an interval L3 provided therebetween.

In rear region 230, support member 41G and support member 41H are adjacent to each other in the vehicle front-rear direction, with an interval L4 provided therebetween. Support member 41H and support member 41I are adjacent to each other in the vehicle front-rear direction, with an interval L5 provided therebetween.

In such a configuration, an average value of the intervals between support members 41 provided to be adjacent to each other in central region 220 is smaller than an average value of the intervals between support members 41 provided to be adjacent to each other in rear region 230 ((L1+L2+L3)/3>(L4+L5)/2).

Figure 9:
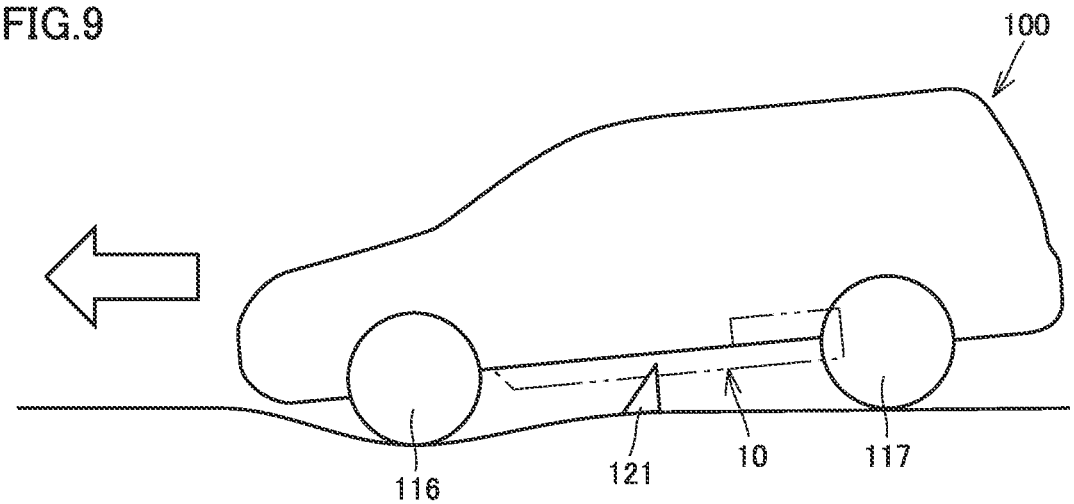
FIG. 9 is a side view showing a manner in which the battery pack interferes with a road surface.

FIG. 9 is a side view showing a manner in which the battery pack interferes with a road surface. Referring to FIG. 9, in such a configuration that battery pack 10 is mounted under floor panel 114, battery pack 10 is easily affected by the road surface. For example, when front wheel 116 or rear wheel 117 of vehicle 100 passes through a recess in the road surface, battery pack 10 may in some cases interfere with a fallen object 121 on the road surface or interfere with a height difference of the road surface. In this case, battery pack 10 may be subjected to excessive shock from the road surface.

In contrast, referring to FIGS. 2 and 8, in the present embodiment, the ratio of the total areas where support members 41 are provided in central region 220 to the area of central region 220 is higher than the ratio of the total areas where support members 41 are provided in rear region 230 to the area of rear region 230.

According to such a configuration, the plurality of support members 41 are provided at different area ratios in central region 220 and in rear region 230, and thus, an amount of support members 41 can be reduced. As a result, an increase in weight of battery pack 10 caused by placement of support members 41 can be suppressed. In addition, central region 220 is far distant from front wheel 116 and rear wheel 117 in the vehicle front-rear direction, and thus, central region 220 is easily subjected to interference from the road surface when front wheel 116 or rear wheel 117 gets stuck in, for example, the recess in the road surface and vehicle 100 inclines. Therefore, by providing support members 41 in central region 220 at a relatively high area ratio, battery pack 10 can be appropriately protected against shock from the road surface.

In addition, rear region 230 is defined over the range from position P2 to position P3 overlapping with rear wheel 117 in the vehicle front-rear direction.

According to such a configuration, even when vehicle 100 inclines as described above, a height between the road surface and rear region 230 can be more reliably ensured by rear wheel 117. Therefore, also in such a configuration that support members 41 are provided in rear region 230 at a relatively low area ratio, battery pack 10 can be more appropriately protected against shock from the road surface.

In addition, each of support members 41 has a cross-sectional shape having base portion 46 provided below bottom portion 27 at a distance therefrom, and the pair of leg portions 47 extending upwardly from base portion 46 and abutting on bottom portion 27 at the ends of the pair of leg portions 47.

According to such a configuration, when battery pack 10 is subjected to shock from the road surface, support members 41 can be deformed such that base portions 46 are displaced upwardly. Thus, the shock can be efficiently absorbed by support members 41 and transmission of the shock to housing case 20 can be suppressed.

Figure 10:
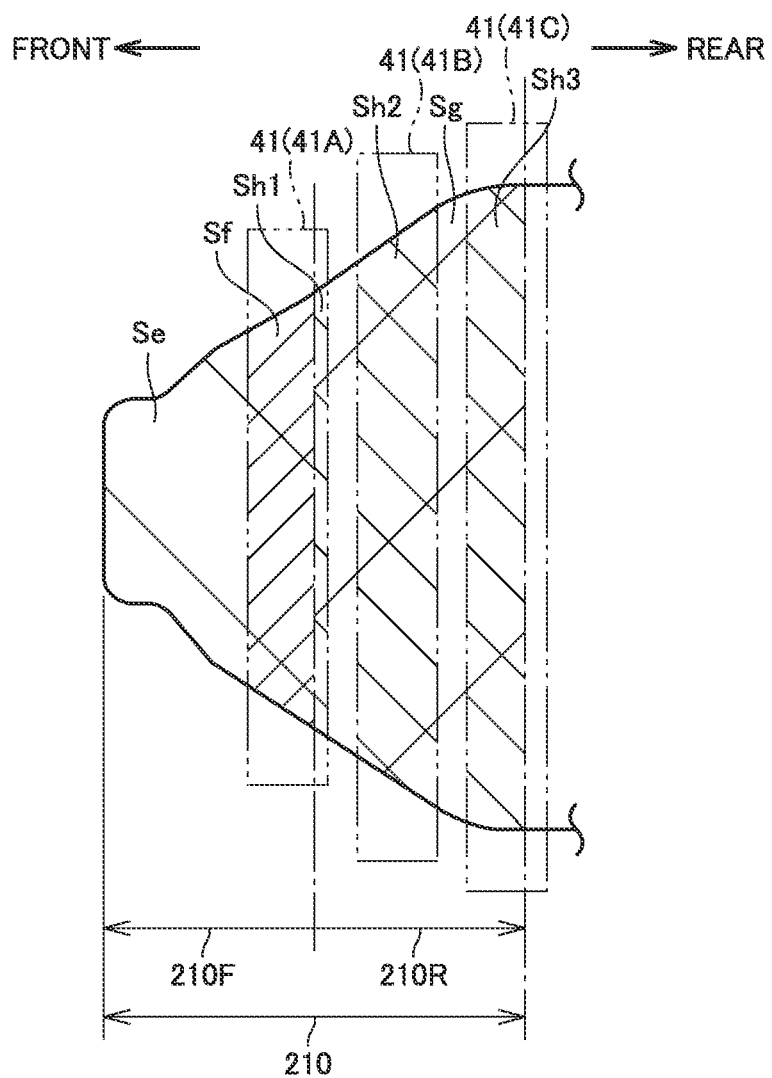
FIG. 10 is a bottom view for illustrating an area ratio between first and second divided regions of the front region in a bottom view of the housing case and the support members provided in the respective divided regions.

FIG. 10 is a bottom view for illustrating an area ratio between first and second divided regions of the front region in a bottom view of the housing case and the support members provided in the respective divided regions.

Referring to FIG. 10, front region 210 is divided into a first divided region 210F and a second divided region 210R. Second divided region 210R is located on the vehicle rear side of first divided region 210F. First divided region 210F is located on the vehicle front side in front region 210, and second divided region 210R is located on the vehicle rear side in front region 210. A length of first divided region 210F in the vehicle front-rear direction is equal to a length of second divided region 210R in the vehicle front-rear direction.

A part of support member 41A is provided in first divided region 210F. The remaining portion of support member 41A, support member 41B and a part of support member 41C are provided in second divided region 210R.

First divided region 210F has an area Se. Support member 41A has an area Sf when projected onto first divided region 210F. Second divided region 210R has an area Sg. Support member 41A has an area Sh1 when projected onto second divided region 210R. Support member 41B has an area Sh2 when projected onto second divided region 210R. Support member 41C has an area Sh3 when projected onto second divided region 210R.

In such a configuration, a ratio of total areas where support members 41 are provided in second divided region 210R to the area of second divided region 210R is higher than a ratio of a total area where support member 41 is provided in first divided region 210F to the area of first divided region 210F ((Sh1+Sh2+Sh3)/Sg>Sf/Se).

Referring to FIGS. 2 and 10, in front region 210, a height between the road surface and first divided region 210F is easily ensured by front wheel 116, whereas it is more difficult to ensure a height between the road surface and second divided region 210R, as compared with the height between the road surface and first divided region 210F. Therefore, as described above, by providing support members 41 in second divided region 210R at a relatively high area ratio, battery pack 10 can be appropriately protected against shock from the road surface.

Front region 210 and central region 220 may have such a relationship that the ratio of the total areas where support members 41 are provided in central region 220 to the area of central region 220 is higher than the ratio of the total areas where support members 41 are provided in front region 210 to the area of front region 210.

The structure of vehicle 100 according to the present embodiment described above will be summarized. Vehicle 100 according to the present embodiment includes: floor panel 114; and battery pack 10 mounted under floor panel 114. Battery pack 10 includes: the plurality of cell stacks 30; housing case 20 including bottom portion 27 and configured to house the plurality of cell stacks 30; and the plurality of support members 41 provided on bottom portion 27 and spaced apart from one another. When front region 210, central region 220 and rear region 230 are defined in a bottom view of housing case 20, the ratio of the total areas where support members 41 are provided in central region 220 to the area of central region 220 is higher than the ratio of the total areas where support members 41 are provided in rear region 230 to the area of rear region 230, central region 220 being located on the vehicle rear side of front region 210 and being equal in length in the vehicle front-rear direction to front region 210, rear region 230 being located on the vehicle rear side of central region 220 and being equal in length in the vehicle front-rear direction to front region 210.

In vehicle 100 according to the present embodiment configured as described above, it is possible to appropriately protect battery pack 10 against shock from the road surface, while suppressing an increase in weight of battery pack 10.

In the present embodiment, the number of support members 41 provided in each of front region 210, central region 220 and rear region 230 is not particularly limited. For example, the number of support members 41 provided in rear region 230 is not limited to the plural number, and one support member 41 may be provided or no support member 41 may be provided. The plurality of support members 41 may include support member 41 that is different in length (width) in the vehicle front-rear direction from the other support members 41. The plurality of support members 41 may include support member 41 having a length (width) smaller than that of bottom portion 27 in the vehicle width direction.

Furthermore, the manner of providing the support members in the present disclosure on the bottom portion of the housing case is not particularly limited. For example, the support members may be provided on the bottom portion from an inner side of the housing case, or may be provided on the bottom portion along the vehicle front-rear direction.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:
1. A vehicle comprising
a floor panel; and
a battery pack mounted under the floor panel,
the battery pack including:
a plurality of cell stacks;
a housing case including a bottom portion and configured to house the plurality of cell stacks; and
a plurality of support members provided on the bottom portion and spaced apart from one another,
when a front region, a central region and a rear region are defined in a bottom view of the housing case, a ratio of a total area where the support member is provided in the central region to an area of the central region being higher than a ratio of a total area where the support member is provided in the rear region to an area of the rear region, the central region being located on a vehicle rear side of the front region and being equal in length in a vehicle front-rear direction to the front region, the rear region being located on the vehicle rear side of the central region and being equal in length in the vehicle front-rear direction to the front region, wherein
the support members are arranged on an outer side of the housing case, and
when cut along a vertical plane, each of the support members has a cross-sectional shape having a base portion provided below the bottom portion at a distance therefrom, and a pair of leg portions extending upwardly from both ends of the base portion and abutting on the bottom portion at ends of the pair of leg portions.
2. The vehicle according to claim 1, further comprising:
a front wheel; and
a rear wheel provided at a distance from the front wheel toward the vehicle rear side, wherein
the central region is defined over a range from a first position between the front wheel and the rear wheel to a second position between the front wheel and the rear wheel in the vehicle front-rear direction, and
the rear region is defined over a range from the second position to a third position overlapping with the rear wheel in the vehicle front-rear direction.
3. The vehicle according to claim 2, wherein
the front region is defined over a range from a fourth position between the front wheel and the rear wheel to the first position in the vehicle front-rear direction, and
when the front region is divided into a first divided region and a second divided region located on the vehicle rear side of the first divided region and being equal in length in the vehicle front-rear direction to the first divided region, a ratio of a total area where the support member is provided in the second divided region to an area of the second divided region is higher than a ratio of a total area where the support member is provided in the first divided region to an area of the first divided region.

* * * * *